(12) United States Patent
Ensign et al.

(10) Patent No.: US 11,352,455 B2
(45) Date of Patent: *Jun. 7, 2022

(54) METHOD OF MAKING A FUNCTIONALIZED ELASTOMER, ELASTOMER, RUBBER COMPOSITION AND TIRE

(71) Applicant: The Goodyear Tire & Rubber Company, Akron, OH (US)

(72) Inventors: Seth Cody Ensign, Akron, OH (US); Margaret Flook Vielhaber, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/793,192

(22) Filed: Feb. 18, 2020

(65) Prior Publication Data

US 2020/0347162 A1 Nov. 5, 2020

Related U.S. Application Data

(60) Provisional application No. 62/841,297, filed on May 1, 2019.

(51) Int. Cl.
*C08F 136/04* (2006.01)
*C08F 36/04* (2006.01)
(Continued)

(52) U.S. Cl.
CPC .............. *C08F 136/04* (2013.01); *B60C 1/00* (2013.01)

(58) Field of Classification Search
CPC ......... C08F 36/04; C08F 4/545; C08F 136/04
See application file for complete search history.

(56) References Cited

U.S. PATENT DOCUMENTS 3,332,919 A 7/1967 Marktscheffel et al.
4,215,014 A 7/1980 Langer, Jr.
(Continued)

FOREIGN PATENT DOCUMENTS

EP 0004739 A2 10/1979
JP 54147191 A 11/1979
(Continued)

OTHER PUBLICATIONS

Hayashi, Tetsuo et al., Manufacture of polyolefins, Manufacture of polyolefins, Database accession No. 1988:38593, XP055731 009, Chemical Abstracts Service, Columbus, Ohio, US.
(Continued)

*Primary Examiner* — Catherine S Branch

(74) *Attorney, Agent, or Firm* — Mandy B. Willis; John D. DeLong

(57) ABSTRACT

The present invention is directed to a method of making a functionalized elastomer, comprising the step of polymerizing a conjugated diene monomer in the presence of a lanthanide-based coordination polymerization catalyst activated with a functionalized aluminum reagent of formula 1

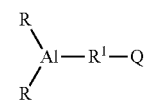

where R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

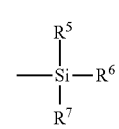

where $R^5$, $R^6$ and $R^7$ are independently a linear or branched alkyl group containing 1 to 3 carbon atoms or a group of formula 3

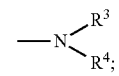

where R3 and R4 are independently phenyl or a linear or branched alkyl group containing 1 to 10 carbon atoms, or R3 and R4 taken together with the nitrogen atom represent a nitrogen containing heterocyclic group containing from 4 to 12 carbon atoms; or $R^5$, $R^6$ and $R^7$ taken together with the silicon atom represent a structure of formula 4

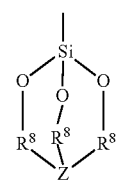

where $R^8$ is C1 to C4 linear or branched alkanediyl and Z is N or a group of formula 5

(Continued)

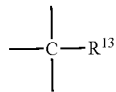

wherein $R^{13}$ is C1 to C8 alkyl.

2 Claims, No Drawings

(51) Int. Cl.
*C08F 4/54* (2006.01)
*B60C 1/00* (2006.01)

(56) References Cited

U.S. PATENT DOCUMENTS

| | | | |
|---|---|---|---|
| 7,411,018 | B2 | 8/2008 | Appel et al. |
| 2010/0000639 | A1* | 1/2010 | Randall ............... C08K 5/40 152/209.1 |

FOREIGN PATENT DOCUMENTS

| | | |
|---|---|---|
| WO | 2010139450 A1 | 12/2010 |
| WO | 2011014533 A1 | 2/2011 |
| WO | 2017189120 A8 | 6/2018 |

OTHER PUBLICATIONS

Quirk et al., Butadiene polymerization using neodymium versatate-based catalysts: catalyst optimization and effects of water and excess versatic acid, Polymer, Elsevier Science Publishers B.V., GB, Jul. 1, 2000, pp. 5903-5908, vol. 41, No. 15.
European Search Report for Serial No. EP20171898 dated Sep. 29, 2020.
Abby R. O'Connor, et al., The Mechanism of Polymerization of Butadiene by "Ligand-Free" Nickel(II) Complexes, J. Am. Chem. Soc., 2007, pp. 4142-4143, 129.
Cottet, et al., Copper-Catalyzed Asymmetric Conjugate Addition of Alkenyl- and Alkylalanes to α,β-Unsaturated Lactams, Organic Letters, Department of Organic Chemistry, University of Geneva, Jan. 29, 2013, pp. 828-831, vol. 15, No. 4, American Chemical Society.
Cueny, et al., Selective Quench-Labeling of the Hafnium-Pyridyl Amido-Catalyzed Polymerization of 1-Octene in the Presence of Trialkyl-Aluminum Chain-Transfer Reagents, ACS Catal. 2018, 8, 2018, pp. 11605-11614, Department of Chemistry, University of Wisconsin, Madison.
Eisch et al., Organometallic Compounds of Group III, XIVV. Orientation in the Hydralumination of Conjugated Olefin Hydrocarbons. Behavior of Allylic Organoaluminum Systems, 1974, pp. 41-55, 64, Journal of Organometallic Chemistry, Elsevier Sequoia S.A.
Eisch, Hydroalumination of C=C and C=C, Reduction: Selectivity, Strategy & Efficiency in Modern Organic Chemistry, 1991, vol. 8.
Evans, et al., Lanthanide Metallocene Reactivity with Diaikyl Aluminum Chlorides: Modeling Reactions Used to Generate Isoprene Polymerization Catalysts, Organometallics, 2005, pp. 570-579, 24, American Chemical Society.
Gao, et al., α-Selective Ni-Catalyzed Hydroalumination of Aryl- and Alkyl-Substituted Terminal Alkynes: Practical Syntheses of Internal Vinyl Aluminums, Halides, or Boronates, Department of Chemistry, Merkert Chemistry Center, Jul. 15, 2010, pp. 10961-10963, 132, J. Am. Chem. Soc.
German, et al., Telechelic Polyethylene from Catalyzed Chain-Growth Polymerization, Angew. Chem. Int. Ed. 2013, 2013, pp. 3438-3441, 52, Wiley-VCH Verlag GmbH & Co. KGaA, Weinheim.
Hannes Leichi et al, Stereoselective Copolymerization of Butadiene and Functionalized 1,3-Dienes, Stereoselective Copolymerization of Butadiene and Functionalized 1,3-Dienes, Jun. 9, 2016 (Jun. 9, 2016), 777-780, vol. 5, No. 6, ACS Macro Letters, Konstanz, DE.
Jian, et al., Living catalyzed-chain-growth polymerization and block copolymerization of isoprene by rare-earth metal allyl precursors bearing a constrained-geometry-conformation ligand, The Royal Society of Chemistry 2010, Mar. 25, 2010, pp. 3022-3024, 46, Chem. Commun.
Kaita, et al., Ultimately Specific 1,4-cis Polymerization of 1,3-Butadiene with a Novel Gadolinium Catalyst, Macromol. Rapid Commun., 2003, pp. 179-184, 24, No. 2, Wiley-VCH Verlag GmbH & Co. KGaA.
Lbraginnov et al., Organometallic Chemistry, Russian Chemical Bulletin, Apr. 1998, pp. 691-694, vol. 47, No. 4, Plenum Publishing Corporation.
Makio, et al., Synthesis of Telechelic Olefin Polymers via Catalyzed Chain Growth on Multinuclear Alkylene Zinc Compounds, Journal of the American Chemical Society, 2013, pp. 8177-8180, 135, ACS Publication.
May, et al., Formation of Vinyl-, Vinylhalide- or Acyl-Substituted Quaternary Carbon Stereogenic Centers through NHC-Cu-Catalyzed Enantioselective Conjugate Additions of Si-Containing Vinylaluminums to β-Substituted Cyclic Enones, Department of Chemistry, Merkert Chemistry Center, Dec. 20, 2010, pp. 736-739, 133, J. Am. Chem. Soc. 2011.
Mei, et al., Enantioselective construction of remote quaternary stereocentres, Nature, Apr. 17, 2014, pp. 340-344, vol. 508.
Müller, et al., New Experimental Conditions for Tandem hydroalumination/Cu-Catalyzed Asymmetric Conjugate Additions to β-Substituted Cyclic Enones, Organic Letters, Department of Organic Chemistry, University of Geneva 30, May 18, 2011, pp. 3040-3043, vol. 13, No. 12, American Chemical Society.
Norsic, et al., Divinyl-End-Functionalized Polyethylenes: Ready Access to a Range of Telechelic Polyethylenes through Thiol-Ene Reactions, Derivatization of Polymers, Angew. Chem. Int. Ed. 2015, 2015, pp. 4631-4635, 54, Wiley-VCH Veriag GmbH & Co. KGaA, Weinheim.
Ottou, et al., Amino End-Functionalized Polyethylenes and Corresponding Telechelics by Coordinative Chain Transfer Polymerization, Macromolecules, Oct. 17, 2017, pp. 8372-8377, 50, ACS Publications.
Sonnek, Aluminiumalkyle mit Heteroatomen, Journal of Organometallic Chemistry, 1987, pp. 31-41, 329, Elsevier Sequoia S.A., Lausanne, The Netherlands.
Valente et al., Coordinative Chain Transfer Polymerization, Chem. Rev. 2013, 113, Feb. 7, 2013, pp. 3836-3857, ACS Publications, American Chemical Society.
Xu, et al., Zirconium-Catalyzed Asymmetric Carboalumination of Unactivated Terminal Alkenes, Acc. Chem. Res., ACS Publications, Sep. 29, 2016, pp. 2158-2168, 49, Herbert C. Brown Laboratories of Chemistry, Purdue University.

* cited by examiner

METHOD OF MAKING A FUNCTIONALIZED ELASTOMER, ELASTOMER, RUBBER COMPOSITION AND TIRE

BACKGROUND

Coordinative chain transfer polymerization (CCTP) using main group metals, i.e., a reversible chain transfer of polymeryl chains between chain growth active metal centers and chain growth inactive metal centers, has become an important strategy in insertion polymerization to reduce the amount of polymerization catalysts, to control the molecular weight and molecular weight distribution of polymers as well as to introduce chain end-functionalization by appropriate quenching of main group metal polymeryls. See Valente et al., Chem. Rev. 2013, 113, 3836-3857; Jian et al., Chem. Commun. 2010, 46, 3022-3024; German et al., Angew. Chem. Int. Ed. 2013, 52, 3438-3441. (b) Norsic et al., Angew. Chem. Int. Ed. 2015, 54, 4631-4635; Makio et al., J. Am. Chem. Soc. 2013, 135, 8177-8180.

Most commonly, commercially available un-functionalized aluminum and zinc alkyls have been employed, with zinc alkyls much better performing in terms of transfer efficiency and thus molecular weight control. With respect to heteroatom-functionalized main group metal alkyls, recently homoleptic di(w-aminoalkyl) magnesium reagents have been used as chain transfer reagents to yield end functionalized amino polyethylenyl magnesiums (Ottou et al., Macromolecules 2017, 50, 8372-8377.) Functionalized magnesium reagents were also employed to initiate polybutadiene chain growth to end-functionalized high trans polybutadiene (Leicht et al., Macromolecules 2018, 51, 763-770), or with increased chain transfer numbers, to functionalized polybutadienes of less uniform stereochemistry (WO201013945).

In contrast, both in organic synthesis and in polymer chemistry, heteroatom-functionalized aluminum reagents have scarcely been used as synthetically useful reactants for the transfer of functional group substituted carbon nucleophiles probably owing to drawbacks in the synthesis of homoleptic aluminum alkyls or the expectedly low chemoselectivity of mixed aluminum alkyls (Xu et al., Acc. Chem. Res. 2016, 49, 2158-2168; Gao et al., J. Am. Chem. Soc., 2010, 132, 10961-10963; May et al., Org. Lett., 2011, 13, 3040-3043.)

SUMMARY

The present invention is directed to a method of making a functionalized elastomer, comprising the step of polymerizing a conjugated diene monomer in the presence of a lanthanide-based coordination polymerization catalyst activated with a functionalized aluminum reagent of formula 1

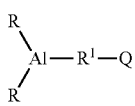

where R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

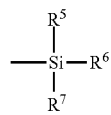

where $R^5$, $R^6$ and $R^7$ are independently a linear or branched alkyl group containing 1 to 3 carbon atoms or a group of formula 3

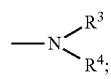

where R3 and R4 are independently phenyl or a linear or branched alkyl group containing 1 to 10 carbon atoms, or R3 and R4 taken together with the nitrogen atom represent a nitrogen containing heterocyclic group containing from 4 to 12 carbon atoms; or $R^5$, $R^6$ and $R^7$ taken together with the silicon atom represent a structure of formula 4

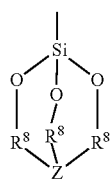

where $R^8$ is C1 to C4 linear or branched alkanediyl and Z is N or a group of formula 5

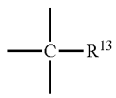

wherein $R^{13}$ is C1 to C8 alkyl.

There is further disclosed a rubber composition comprising the functionalized elastomer produced by this method, and a tire comprising the rubber composition.

DESCRIPTION

There is disclosed a method of making a functionalized elastomer, comprising the step of polymerizing a conjugated diene monomer in the presence of a lanthanide-based coordination polymerization catalyst activated with a functionalized aluminum reagent of formula 1

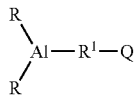

where R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

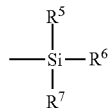

2 where $R^5$, $R^6$ and $R^7$ are independently a linear or branched alkyl group containing 1 to 3 carbon atoms or a group of formula 3

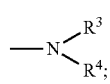

3 where R3 and R4 are independently phenyl or a linear or branched alkyl group containing 1 to 10 carbon atoms, or R3 and R4 taken together with the nitrogen atom represent a nitrogen containing heterocyclic group containing from 4 to 12 carbon atoms; or $R^5$, $R^6$ and $R^7$ taken together with the silicon atom represent a structure of formula 4

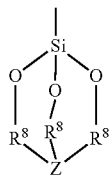

4 where $R^8$ is C1 to C4 linear or branched alkanediyl and Z is N or a group of formula 5

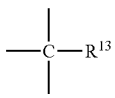

5 wherein $R^{13}$ is C1 to C8 alkyl.

There is further disclosed a rubber composition comprising the functionalized elastomer produced by this method, and a tire comprising the rubber composition.

Polymerizations according to the method utilizes a lanthanide-based catalyst system. Suitable catalysts include neodymium based catalysts, including neodymium carboxylates.

Such polymerizations are typically conducted in a hydrocarbon solvent that can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In one embodiment, the neodymium catalyst system used in the process of this invention is made by preforming three catalyst components. These components are (1) the functionalized aluminum compound of formula 1, (2) a neodymium carboxylate, and (3) an organoboron salt compound.

The neodymium carboxylate utilizes an organic monocarboxylic acid ligand that contains from 1 to 20 carbon atoms, such as acetic acid, propionic acid, valeric acid, hexanoic acid, 2-ethylhexanoic acid, neodecanoic acid, lauric acid, stearic acid and the like neodymium naphthenate, neodymium neodecanoate, neodymium octanoate, and other neodymium metal complexes with carboxylic acid containing ligands containing from 1 to 20 carbon atoms.

The organoboron salt compound can be an ionic compound consisting of an organoboron anion with a cation.

Examples of the organoboron anion include tetraphenylborate ($[BPh_4]^-$), tetrakis(monofluorophenyl)borate ($[B(C_6F_5)_4]^-$), tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (tripheyl, pentafluorophenyl)borate, [tris(pentafluorophenyl), phenyl]borate, and decahydro-7,8-dicarbanium borate.

Examples of the cation include a carbonium cation, an oxonium cation, an ammonium cation, a phosphonium cation, a cycloheptatrienyl cation, and a ferrocenium cation containing a transition metal. Here, the carbonium cation includes trisubstituted carbonium cations such as a triphenylcarbonium cation ($[Ph_3C]^+$) and a tri(substituted phenyl)carbonium cation, and a more specific example of the tri(substituted phenyl)carbonium cation includes a tri(methylphenyl)carbonium cation. Examples of the ammonium cation include: trialkylammonium cations such as a trimethylammonium cation, a triethylammonium cation ($[NEt_3H]^+$), a tripropylammonium cation, and a tributylammonium cation; N,N-dialkylanilinium cations such as a N,N-dimethylanilinium cation ($[PhNMe_2H]^+$), a N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation.

Examples of the organoboron salt compound include $[Ph_3C][B(C_6F_5)_4]$, $[PhNMe_2H][BPh_4]$, and $[NEt_3H][BPh_4]$, $[PhNMe_2H][B(C_6F_5)_4]$.

An organoboron compound having the same function as that of the organoboron salt compound, such as $B(C_6F_5)_3$, can also be used.

Functionalized aluminum reagents of formula 1 and 2 may be produced by reaction of a compound of formula 6 with a dialkyl aluminum hydride of formula 7

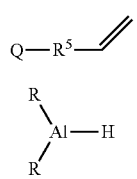

6

7 where $R^5$ is phenylene, or a linear or branched alkane diyl group containing 1 to 9 carbon atoms, or a combination of one or more phenylene groups and one or more linear or branched alkane diyl groups containing 1 to 10 carbon atoms, and R and Q are as previously defined.

The reaction of the compounds of formulas 6 and 7 may be done neat at a temperature ranging from 25 to 90 C for 12 to 72 hours. Optionally, the reaction may proceed in a hydrocarbon solvent in the presence of a neodymium (III) catalyst.

In one embodiment, the compound of formula 4 is diisobutyl aluminum hydride (DIBAL-H).

The concentration of the total catalyst system employed of course, depends upon factors such as purity of the system, polymerization rate desired, temperature and other factors. Therefore, specific concentrations cannot be set forth except to say that catalytic amounts are used.

Temperatures at which the polymerization reaction is carried out can be varied over a wide range. Usually the temperature can be varied from extremely low temperatures such as −60° C. up to high temperatures, such as 150° C. or higher. Thus, the temperature is not a critical factor of the invention. It is generally preferred, however, to conduct the reaction at a temperature in the range of from about 10° C. to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

Examples of useful functionalized aluminum compounds of formula 1 include but are not limited to compounds such as the following compounds

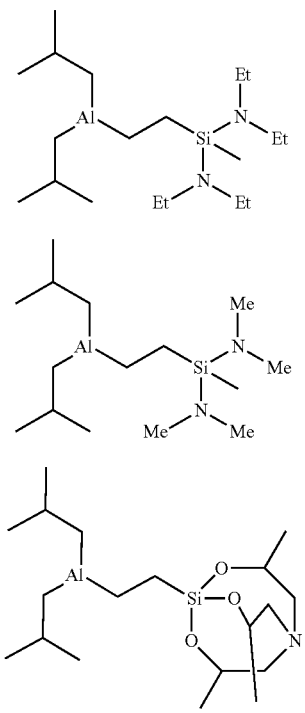

The polymerization can be quenched or terminated by the addition of a functional terminator, an alcohol or another protic source, such as water.

In one embodiment, the polymerization is terminated using a functional terminator. By functional terminator, it is meant an organic compound capable of terminating the polymerization reaction, wherein the organic compound is substituted with a functional group comprising at least one heteroatom selected from phosphorus, boron, oxygen, halogens and silicon.

In one embodiment, the functional terminator comprises at least one functional group selected from the group consisting of phosphane, phosphonic acid, phosphate, phosphodiester, phosphotriester, silyl, alklysilyl, alkoxysilyl, and siloxy.

Useful functional terminators include but are not limited to tetraethoxysilane, n-octyltriethoxysilane, 3-chloropropyltriethoxysilane, and chlorodiphenylphosphine.

Suitable monomers for use in the polymerization are conjugated diene monomers and functionalized versions thereof. Suitable conjugated diene monomers include 1,3-butadiene and isoprene. Other suitable conjugated diene monomers include 2,3-dimethyl-1,3-butadiene, piperylene, 3-butyl-1,3-octadiene, 2-phenyl-1,3-butadiene, and the like, and combinations thereof.

The use of functional aluminum based chain transfer reagents of formula 1 imparts functionality on the end of every polymer chain end to produce a functionalized polymer. By combining the technique with known functionalization techniques such as termination with functional terminators or copolymerization with functional monomers, the polymerization results in stereoregular polymers that contain functionality on both ends, as well as in-chain. Either high-cis or high-trans polymers can be made through changes to the catalyst system, without affecting the functionalization reactions. By stereoregular, it is meant that the polymer microstructure includes at least 80 percent by weight of monomer residues (i.e., polymer subunits derived from a given monomer) in the cis 1,4-configuration, or 90 percent by weight of monomer residues in the trans 1,4-configuration. In one embodiment, the polymer contains at least 85 percent by weight of monomer residues in cis 1,4-configuration. In one embodiment, the polymer contains at least 95 percent by weight of monomer residues in trans 1,4-configuration.

The functionalized polymer made using the methods of the invention may be compounded into a rubber composition.

The rubber composition may optionally include, in addition to the functionalized polymer, one or more rubbers or elastomers containing olefinic unsaturation. The phrases "rubber" or "elastomer containing olefinic unsaturation" or "diene-based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber;

vinyl compounds, for example, acrylic acid, acrylonitrile, which polymerize with butadiene to form NBR, methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect, the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including, but not limited to, those disclosed in U.S. Pat. No. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment, the rubber composition may contain a conventional sulfur containing organosilicon compound. In one embodiment, the sulfur containing organosilicon compounds are 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the resulting vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

What is claimed:

1. A method of making a functionalized elastomer, comprising the step of polymerizing a conjugated diene monomer in the presence of a lanthanide-based coordination polymerization catalyst activated with a functionalized aluminum reagent of formula 1

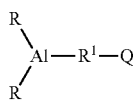

1 wherein R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

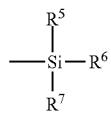

2 wherein $R^5$, $R^6$ and $R^7$ are independently a linear or branched alkyl group containing 1 to 3 carbon atoms or a group of formula 3

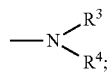

3 where R3 and R4 are independently phenyl or a linear or branched alkyl group containing 1 to 10 carbon atoms, or R3 and R4 taken together with the nitrogen atom represent a nitrogen containing heterocyclic group containing from 4 to 12 carbon atoms; or $R^5$, $R^6$ and $R^7$ taken together with the silicon atom represent a structure of formula 4

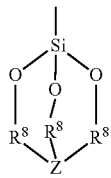

4 wherein $R^8$ is C1 to C4 linear or branched alkanediyl and Z is N or a group of formula 5

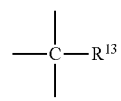

5 wherein $R^{13}$ is C1 to C8 alkyl.

2. The method of claim 1, wherein the functionalized aluminum reagent is selected from the group consisting of:

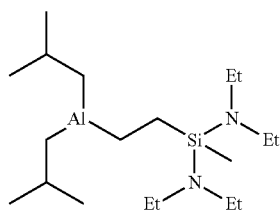

A

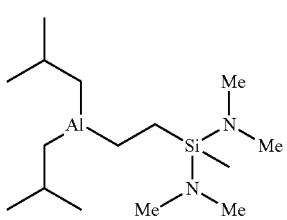

B

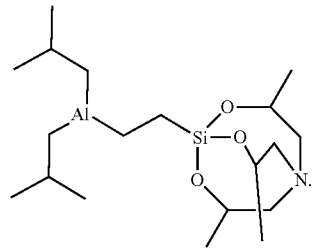

C

* * * * *